US 6,655,807 B2

(12) United States Patent
McPherson et al.

(10) Patent No.: US 6,655,807 B2
(45) Date of Patent: Dec. 2, 2003

(54) LINEAR SLIDE MECHANISM FOR AN EXTENDABLE REARVIEW MIRROR FOR VEHICLES

(75) Inventors: John S. McPherson, Perkasie, PA (US); Thomas Culp, Southampton, PA (US); Cory Brechbill, Schwenksville, PA (US); Keith Fitzgerald, Quakertown, PA (US)

(73) Assignee: Delbar Products, Inc., Perkasie, PA (US)

( * ) Notice: Subject to any disclaimer, the term of this patent is extended or adjusted under 35 U.S.C. 154(b) by 76 days.

(21) Appl. No.: 10/092,580

(22) Filed: Mar. 8, 2002

(65) Prior Publication Data

US 2002/0149863 A1 Oct. 17, 2002

Related U.S. Application Data

(60) Provisional application No. 60/283,753, filed on Apr. 16, 2001.

(51) Int. Cl.[7] .............................. B60R 1/06; B60R 1/07; B60R 1/072; G02B 7/182; G02B 5/08
(52) U.S. Cl. ..................... 359/841; 359/872; 359/875; 359/877; 359/881; 248/480
(58) Field of Search .................. 359/841, 844, 359/871, 872, 875, 877, 881; 248/480

(56) References Cited

U.S. PATENT DOCUMENTS

| 4,702,572 | A | * | 10/1987 | Cossey | ...................... 359/876 |
|---|---|---|---|---|---|
| 4,927,255 | A | * | 5/1990 | Martinez | ..................... 359/855 |
| 4,998,812 | A | * | 3/1991 | Hou | .......................... 359/841 |
| 5,106,177 | A | * | 4/1992 | Dolasia | ..................... 359/876 |
| 5,572,376 | A | | 11/1996 | Pace | ........................... 359/877 |
| 5,969,890 | A | | 10/1999 | Whitehead | .................. 359/841 |
| 6,039,455 | A | * | 3/2000 | Sorenson | .................... 362/142 |
| 6,116,743 | A | | 9/2000 | Hoek | ......................... 359/871 |
| 6,276,805 | B1 | * | 8/2001 | Home et al. | ................ 359/841 |

FOREIGN PATENT DOCUMENTS

| EP | 0 385 814 A1 | * | 9/1990 |
| GB | 1388173 | * | 3/1975 |
| GB | 2100205 A | * | 12/1982 |

* cited by examiner

Primary Examiner—John Juba
(74) Attorney, Agent, or Firm—Gregory J. Gore

(57) ABSTRACT

An extensible outside rearview mirror for a vehicle includes a spring-clamped slide mechanism that ensures a zero clearance fit between sliding components to avoid vibration. Bearing members between the sliding components reduce friction and provide a consistent reaction force to ensure smooth operation of an actuator mechanism which extends or retracts the mirror assembly along a support arm. The slide mechanism includes V-shaped guiderails vertically aligned with opposing V-shaped guiderails on the mounting bracket assembly. Rod-like bearing means are interposed between the opposing guiderail pairs. A cantilever clamp jaw with spring means biases one guiderail toward the other with a high spring force which provides superior rigidity and thus enhanced mirror image clarity.

21 Claims, 5 Drawing Sheets

POINT CONTACT BEFORE BREAK-IN

SURFACE CONTACT AFTER BREAK-IN

LINEAR SLIDE MECHANISM FOR AN EXTENDABLE REARVIEW MIRROR FOR VEHICLES

Priority based upon provisional application Ser. No. 60/283,753 filed on Apr. 16, 2001, entitled "Linear Slide Mechanism for an Extendable Rearview Mirror for Vehicles" is hereby claimed.

FIELD OF THE INVENTION

The present invention relates to a rearview mirror for a vehicle which is extendable toward or away from the vehicle laterally to selectively provide different viewing positions as desired, for example when the vehicle is towing a trailer or the like.

BACKGROUND OF THE INVENTION

It is known to provide vehicles with extendable rearview mirrors which extend selectively from the vehicle body along a support arm which extends laterally from the body of the vehicle. This type of extendable mirror is shown for example in U.S. Pat. No. 5,572,376 issued to Pace. The Pace mirror further includes a rack gear drive and a flexible boot which provides a cover between the vehicle and the motor housing to protect portions of the apparatus from exposure. A problem with this prior art device, however, is that the slidable components of the sub-assembly and support arm produce wear of the parts, thus creating undesirable movement in the slide assembly which produces excessive vibration in the mirror assembly resulting in poor vision through the mirror. It is known to use plate springs such as shown in the above-captioned U.S. patent to Pace to take up clearances between slide components of the extension arm mechanism however, because of the limited space between these parts, the practical use of this type of spring provides a spring force which is relatively weak in relation to the reaction forces created by the mass of the mirror sub-components.

Another extendable rearview mirror for a vehicle is disclosed in U.S. Pat. No. 6,116,743 issued to Hock. The mirror assembly of the Hock device includes a bracket which is slidable around a support arm and includes internal spring means for taking up the gap between the outer surface of the support arm and the inner surface of the bracket. This device is a complex assembly of many small parts including screws and other fasteners. U.S. Pat. No. 5,969,860 issued to Whitehead shows an extendable mirror which slides along longitudinal rails located on the outside of the mirror housing. Hence the rails are not protected from the adverse elements of the weather.

There is therefore a need in the art for an extensible rearview mirror support mechanism which is resistant to wear and which remains extremely stable and vibration-resistant throughout the entire stroke of its motion. It is further desired to provide a mechanism which is easily assembled to allow high volume manufacturing. For yet further economy of manufacture there is a need to provide a "no-tool assembly" of parts.

SUMMARY OF THE INVENTION

In order to solve the needs in the art explained above, the present invention provides an extendable rearview mirror for a vehicle which provides a spring-clamped slide mechanism that ensures a zero tolerance fit between sliding components to avoid vibration. It further includes bearing members between the sliding components to reduce friction and provide a consistent reaction force to ensure smooth operation of the actuator mechanism. This type of mirror is particularly useful in situations where the vehicle is towing something behind it and enhanced rearward vision is provided by positioning the rearview mirror to its fully-extended position.

The superior functional characteristics of the present invention are provided by a unique support bar clamp mechanism which slidably affixes the rearview mirror housing and other components of the rearview mirror assembly to the support arm. The sliding movement is achieved with accurate slidable engagement of the mirror assembly along the support arm through the full extent of its longitudinal movement. This structure includes unique upper and lower V-shaped guide rails which face opposing V-shaped guide rails on the mounting bracket assembly. Rod-like bearing means are interposed between the bracket guide rails and the support arm guide rails to engage the mounting bracket and the support arm against movement in any direction except along the longitudinal axis of the support arm.

To achieve a sufficient amount of clamp force, the bracket assembly includes a cantilever clamp jaw which also includes the lower bracket guide rail. The clamp jaw is pivotal about a fulcrum and is biased toward clamping engagement with the support arm by spring means which is operative between a mirror sub-assembly mounting bracket and the lever arm of the clamp jaw which extends to the opposite side of the mounting bracket. Because of the shape of modern rearview mirror housings that is dictated by aesthetic considerations, there is a large void in the housing behind the mirror assembly mounting bracket. Since the spring means of the present invention is behind the bracket and positioned in this void, a single, large spring with a high spring force can be used. This high spring force provided by the present invention contributes significantly to the superior rigidity of the present design compared to the prior art. Support arm clamp force may be further increased by the mechanical leverage provided by the clamp jaw lever arm.

In one embodiment of the invention the bearing rods are composed of an ablatable material which leaves deposits on the support arm guide rails as it is used. These material deposits act as a filler to smooth over surface irregularities of the guide rails which may be present if inexpensive casting methods are used to form the rails. In this way, the respective bearing surfaces are increased in area as the bearings "wear in". This occurs rapidly since the unit surface pressure between the bearing material and the guide rails is initially very high due to the very small point of contact between the cylindrical outer surface of the rod and the flat surfaces of the V-shaped rails. When the slide mechanism is operated, the material of the bearing rods is quickly removed from the rods and deposited along the surface of the support arm rails until a point of equilibrium is reached between the surface friction and the increase in bearing surface area. Once this wear-in point is reached, a consistent and low coefficient of surface friction is maintained.

More specifically, the applicants have invented an extendable rearview mirror assembly for a vehicle which includes a rotatable support arm for attachment to a vehicle body. A mirror assembly is mounted on the support arm and includes a bracket and a surrounding housing affixed thereto. A mirror sub-assembly including a mirror glass, support plate, and motor-driven positioning means is affixed to a first side of the bracket and lies within the housing. The assembly includes clamp means with jaws on the bracket for slidably affixing the bracket to the support arm. A first clamp jaw is adjacent the top of the housing and stationary with respect to the bracket and engages a first guide rail located along a top of the support arm. A second movable clamp jaw is adjacent the bottom of the housing and includes pivot means to forceably engage a second guide rail located along a bottom of the support arm. The first and second jaws define a substantially vertical clamping plane between them which lies along the first side of the bracket. The mirror assembly also includes a first bearing means interposed between the first jaw and first guide rail and a second bearing means interposed between the second jaw and the second guide rail. Both bearing means are elongate, rod-shaped members composed of solid PFTE, a substantially ablatable material, such that initial operation of the slide mechanism causes the bearing means to deposit friction-reducing material upon the surfaces of the guide rails. The first and second jaws each include a guide rail and face opposite their respective support arm guide rails. All guide rails further include surfaces which have a V-shaped cross-section. The movable clamp jaw includes force-applying spring means urging the second jaw in a direction of clamping and is movable to a point of release where the bracket is laterally releasable from the support arm. The second clamp jaw moves by way of a lever arm having a first end which engages the coil-type compression spring means and extends to an opposite side of the bracket. The bracket has a fulcrum about which the lever arm pivots. The fulcrum is on a bottom support plate of the bracket which holds the spring and the second jaw in their operative positions solely by the co-mutual compression of engaged parts. The spring operates between the end of the lever arm and an abutment both being located on the opposite side of the bracket. The aggregate center of mass of all components is adjacent the plane of clamping.

The assembly also comprises a support arm having a mounting bracket affixed to it in slidable engagement. The clamp means on the bracket includes two jaws each engaging top and bottom edges of the support arm respectively, the clamp means including a movable jaw which pivots on a lever arm extending from the bracket such that the movable jaw forceably engages a bearing surface along one of the edges of the support arm. The bracket is slidably affixed to the support arm on only one side such that when the jaw is moved to a point of release, the jaws of the clamp means are laterally releasable from the edges of the support arm.

The low friction of the slide assembly of the present invention is beneficial in that it requires a lower actuator force which contributes to the lower power consumption, low noise, and longer life of the actuator motor and drive system which may be any suitable screw or gear-drive system known in the art. The invention achieves all of these attributes while rigidly restricting movement along all axes of motion except the longitudinal axis of the support arm. The rigidity of the system is further enhanced by employing guide rails which are vertically spaced a greater distance apart than other known internal slide assemblies. This provides wide-track stability in the vertical plane and thus torsional vibration is mitigated and stable reflected vision through the mirror plate is achieved. Other objects and advantages of the present invention will be apparent from the following drawings and description of the preferred embodiment.

DESCRIPTION OF THE PREFERRED EMBODIMENT

Figure 1:
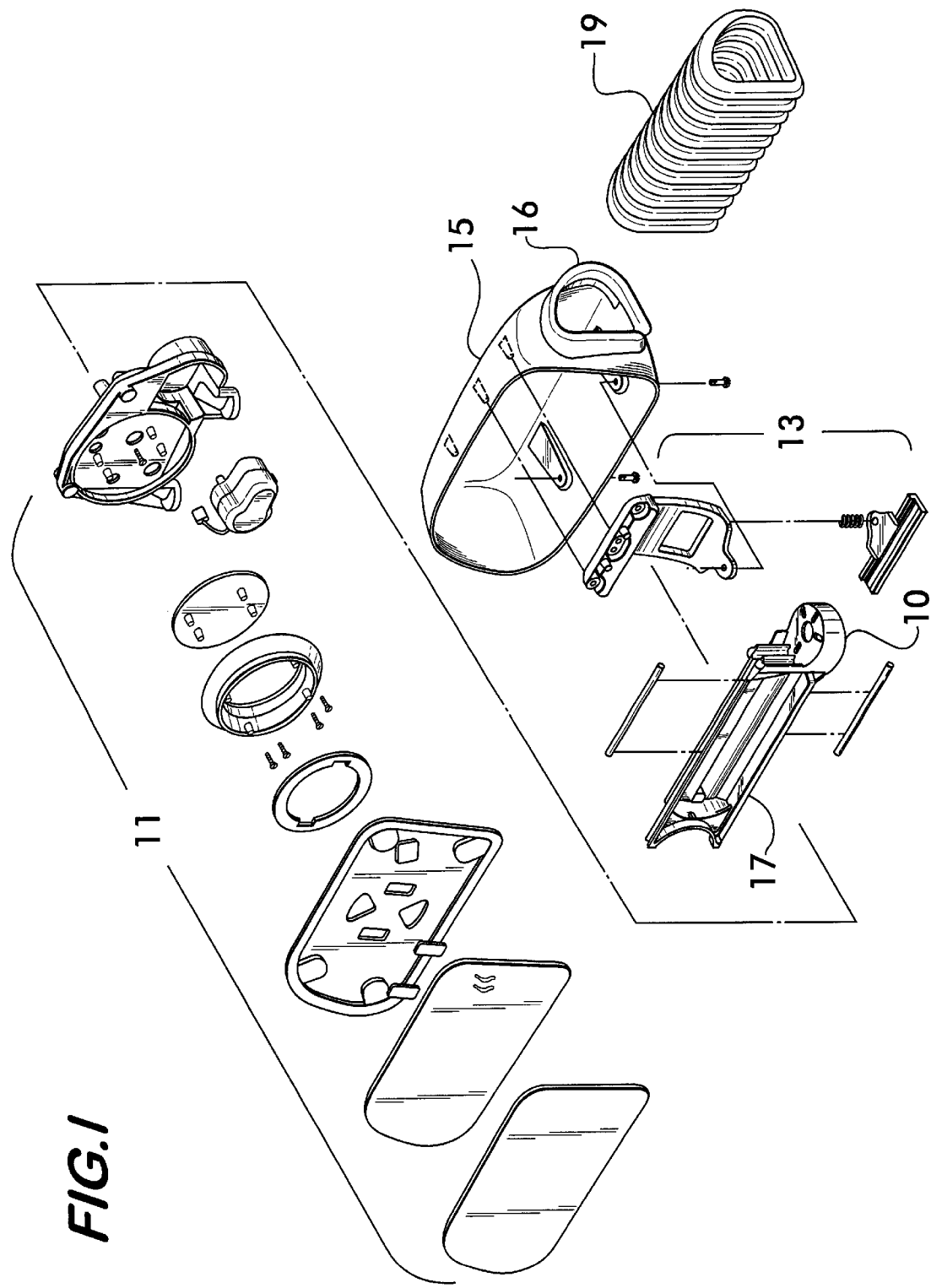
FIG. 1 shows an exploded perspective view of a rearview mirror unit which employs the slide assembly of the present invention.

Referring now to FIG. 1, an exploded assembly view of the present invention including all major components of the rearview mirror are shown. A mirror sub-assembly 11 comprises a mirror glass support and motor driven positioning elements fitted to the bracket assembly 13 which includes support arm 17 that is attached to a vehicle body bracket (not shown) preferably by rotatable mount 10 at one end of the arm. The bracket of the slide assembly is affixed to housing 15 that includes an aperture 16 through which the support arm 17 extends. The assembly may further include an extensible-contractible flexible boot 19 to protect the support arm from exposure.

Figure 2:
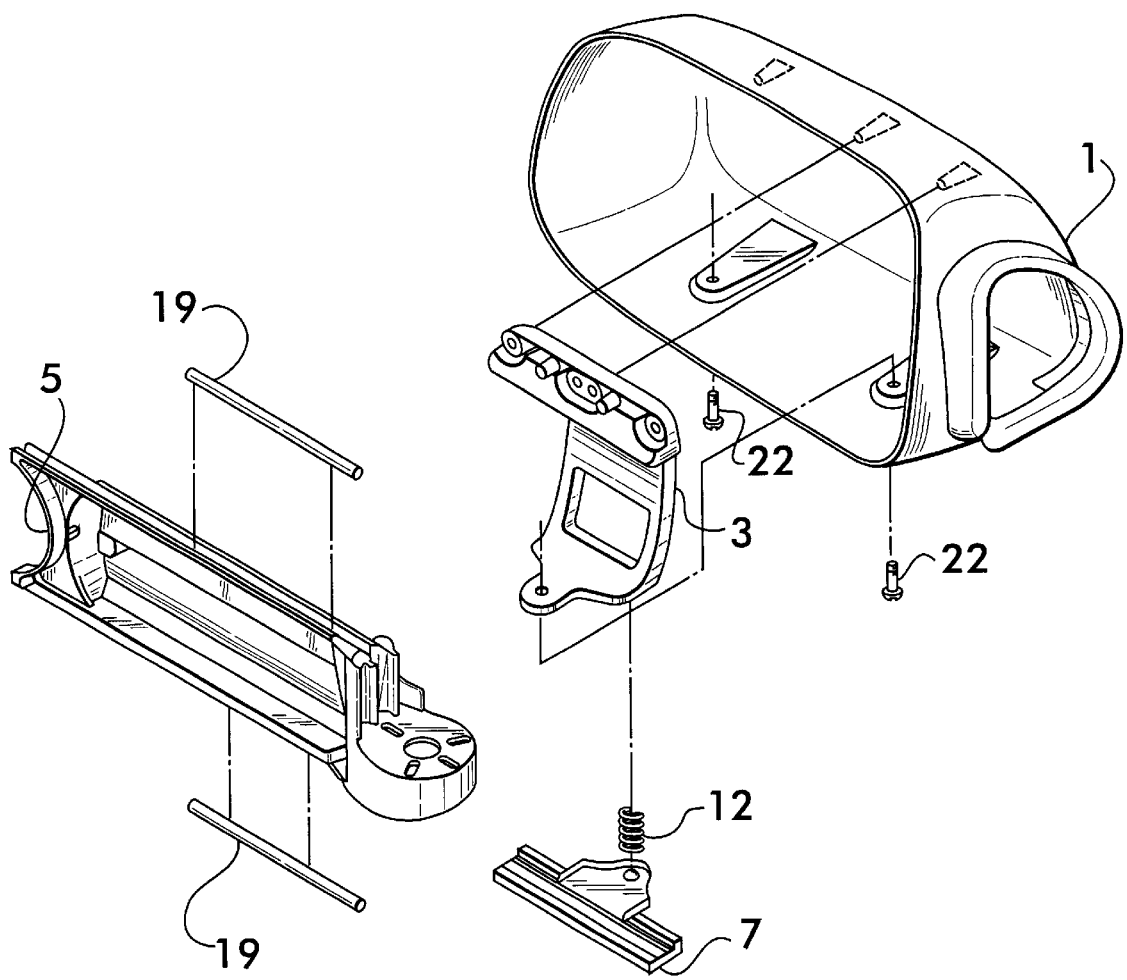
FIG. 2 is a partial view of FIG. 1 showing the main components representing the slide mechanism of the present invention.

Referring now to FIG. 2, the preferred embodiment of the slide mechanism of the present invention includes bearing rods 19 which are interposed between the V-shaped guide rails of support arm 5 and complementary opposing V-shaped rails on the bracket assembly. The bracket assembly includes bracket 3 and clamp jaw 7 which is biased toward the upper guide rail of the bracket by spring means 12 which supplies a spring force through a lever arm of the clamp jaw that extends to the opposite side of the bracket. The bracket 3 is affixed to the mirror housing 1 by suitable attachment means such as screws 22.

Figure 3:
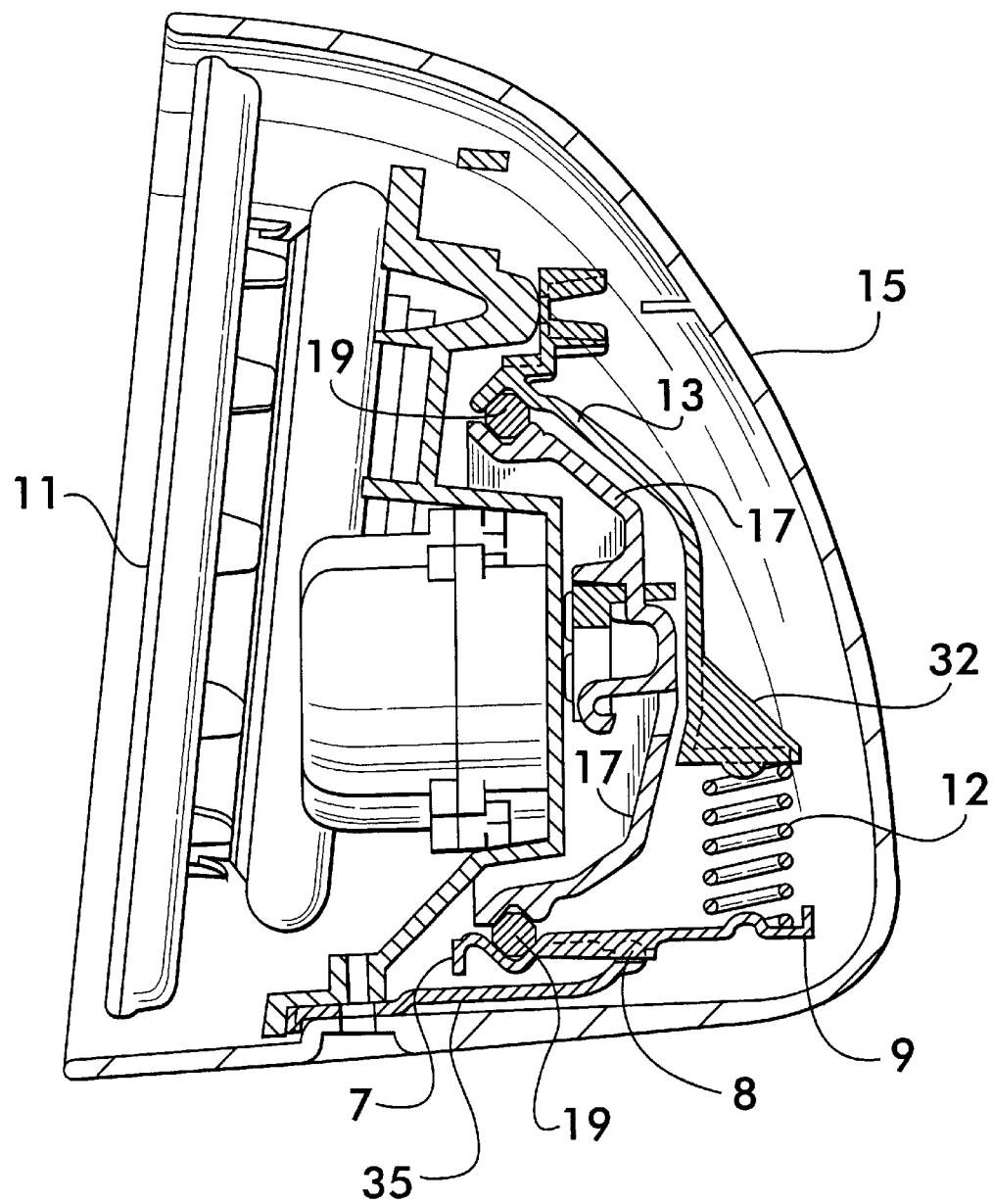
FIG. 3 is a side sectional view of the completed assembly of parts shown in FIG. 1.

Referring now to FIG. 3, a side sectional view of the complete assembly of components shown in FIG. 1, is depicted. Bracket assembly 13 carries the mirror sub-assembly 11 that includes the mirror glass, a support plate, and motor driven positioning means. The cantilever clamp jaw 7 pivots upon fulcrum 8 to forceably clamp the support arm 17 into slidable engagement with the bracket assembly. The fulcrum 8 is located along a portion of the bracket bottom support plate 35. A lever arm 9 of the clamp jaw extends to the opposite side of the bracket assembly and is forced downward by compression coil spring 12 that operates between the end of clamp jaw lever arm 9 and bracket spring abutment 32. Bearing rods 19 are interposed between opposing V-shaped guide rails which laterally traverse the top and bottom edges of both the bracket assembly and the support arm. By this construction, the support arm rails are self-centering between the bracket rails. Also, it will be readily understood from the mechanical relations shown in FIG. 3 that movement of the support arm with regard to the bracket assembly will be rigidly restricted along all axes of motion except the longitudinal axis of the support arm. It will further be observed that spring means 12 will alone retain the assembly of the parts without the need for any other fastening means, all parts being held together in interlocking engagement by the spring force of spring 12. This provides greatly reduced assembly time and fewer parts.

The guide rails are preferably coplanar in the vertical plane therefore providing great rigidity against torsion in the vertical plane. Furthermore, the bracket and support arm are preferably C-shaped so that the center mass of the mirror sub-assembly is close to the vertical plane defined by the guide rails and the support arm. The forward extending (relative to the vehicle) lever arm and spring also aid in advantageously locating the center of mass of the mirror sub-assembly proximate to the guide rail plane. This further adds to the rigidity of the assembly by decreasing the torsional reaction force moment about the support arm axis created by vertical accelerations.

Figure 4:
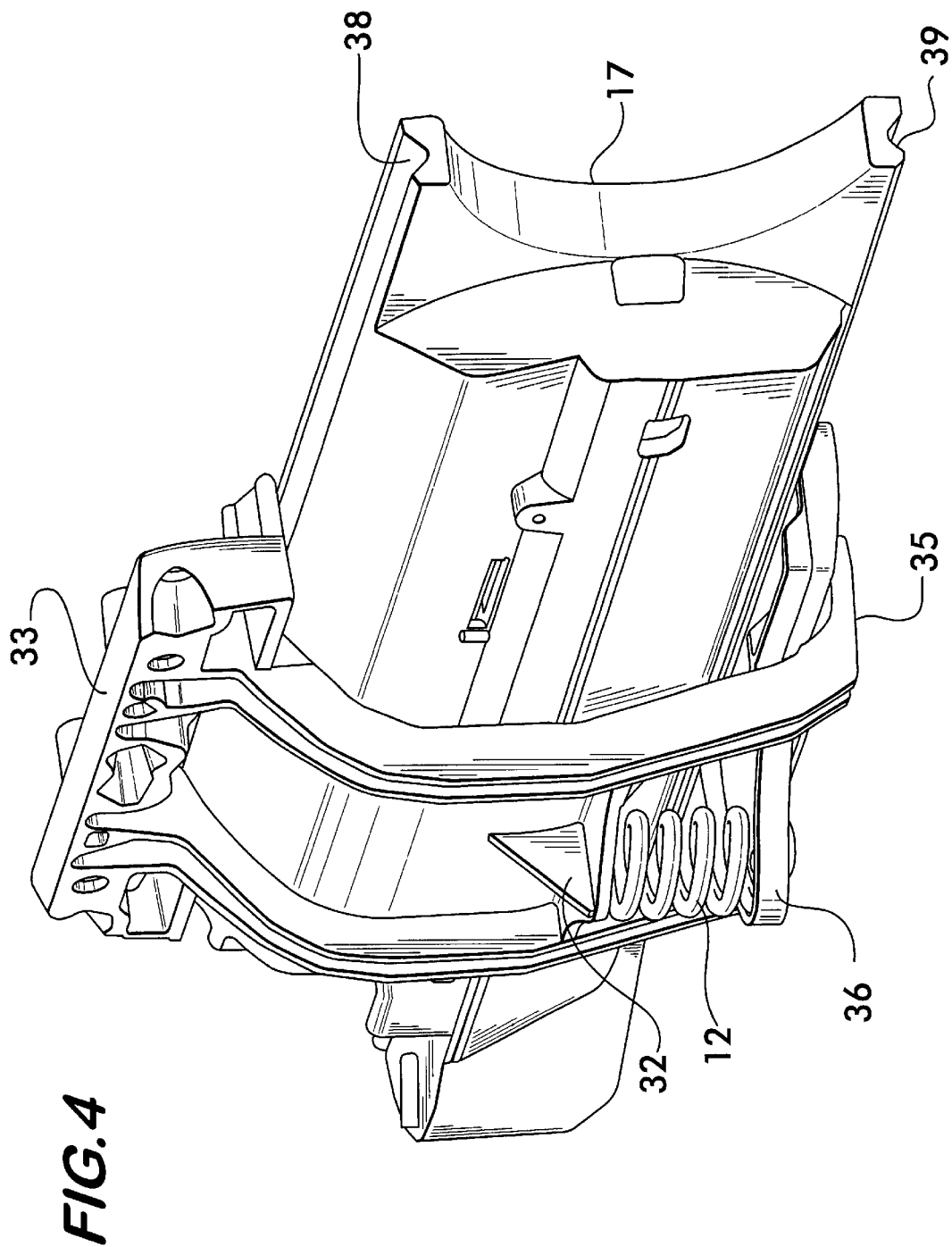
FIG. 4 is a top rear isometric view of the slide assembly of the present invention.

Referring now to FIG. 4, the clamp jaw lever arm and spring means is clearly depicted. Bracket 33 includes a bottom support plate 35 which captively receives a projection of the cantilever clamp jaw to establish a fulcrum and point of rotation. Spring means 12 operates between the end of the clamp jaw lever arm 36 and an abutment 32. Support arm 17 includes upper and lower V-shaped guide rails 38 and 39 respectively. Since coil spring 12 is not located directly between the sliding parts, it may be a large and powerful spring which can supply the desired amount of rigidity to the slide assembly.

Figure 5A:
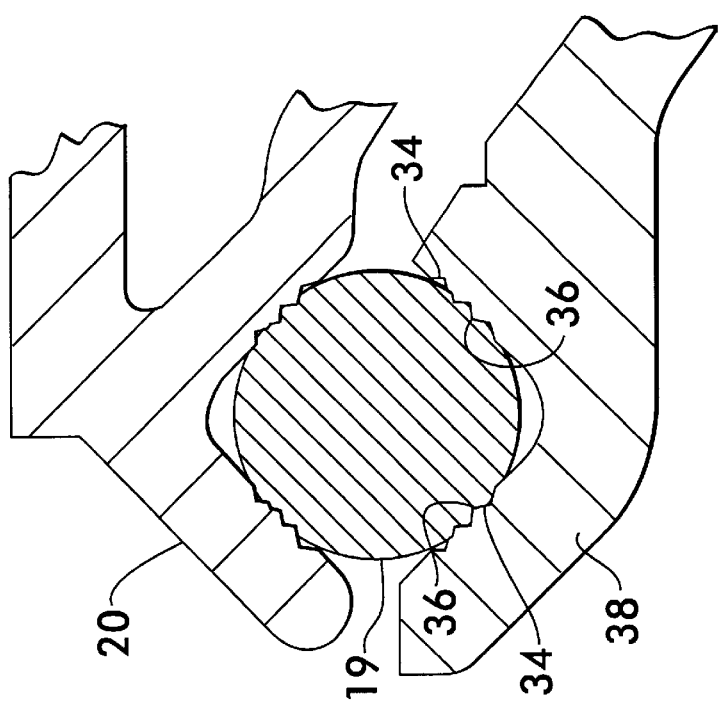
FIGS. 5a and 5b are side sectional views of the bearing and guide rail points of engagement showing the initial surface contact points before and after break-in respectively.
Figure 5B:
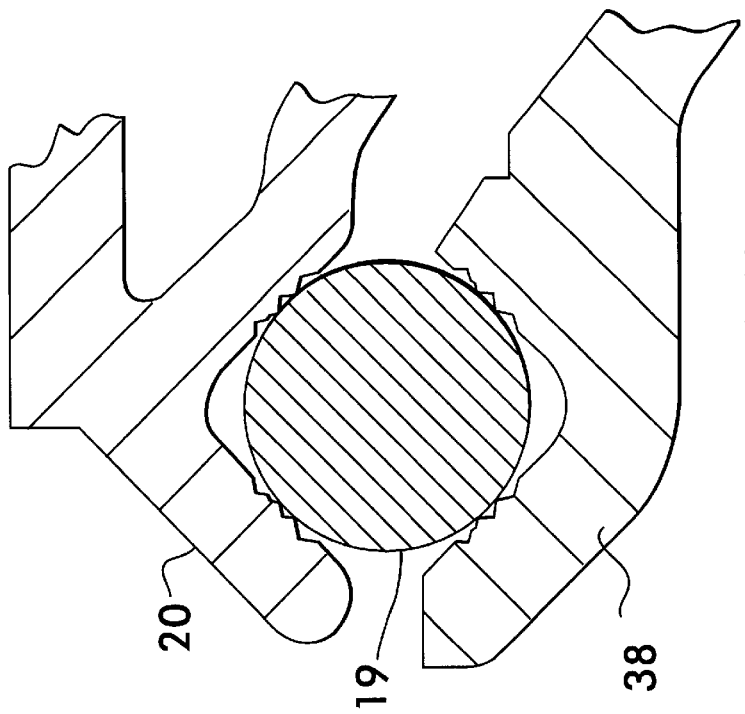

Referring now to FIGS. 5a and 5b, before and after side sectional views of the bearing rod and guide rail contact points are shown for the upper support arm guide rail 38 and opposing upper bracket guide rail 20. As depicted in these illustrations, the bearing rods 19 deposit some of their material 34 along the surface of the guide rails 38 of the support arm as the bearing rods 19 wear in. Initially, frictional points of contact are along lines on the surface of the bearing rods. As the slide mechanism wears in, the areas of contact 36 become planar (i.e. flat surfaces) and thus contact area is greatly increased after break-in. This reduces the coefficient of friction between the sliding parts and provides a uniform contact surface area between the sliding parts at all points along the stroke of the bracket assembly. The increase in contact surface area also contributes to the rigidity of the mechanical engagement between the parts. Unwanted vibration is further mitigated by the use of a soft, ablative bearing material, of the preferred type. Such a material is solid Teflon® PFTE of the general type.

It will be understood to those of skill in the art that there may be many modifications and adaptations of the invention other than those specifically described from the foregoing preferred embodiment and alternate embodiments. However, the present invention should be limited in scope only by the following claims and their legal equivalents.

What is claimed is:

1. An extendable rearview mirror assembly for a vehicle, comprising:
    a support arm for attachment to a vehicle body;
    a mirror assembly mounted on said support arm, said mirror assembly including a bracket and a surrounding housing affixed thereto;
    a mirror subassembly affixed to a first side of the bracket and lying within said housing; and
    clamp means on said bracket for slidably affixing said bracket to said support arm, comprising;
        a first jaw being stationary with respect to said bracket and engaging a first guide rail located along a top of said support arm; and
        a second, movable jaw including pivot means, said second jaw forceably engaging a second guide rail located along a bottom of said support arm, said first and second jaws defining a clamping plane between them which lies along the first side of said bracket.

2. The mirror assembly of claim 1 wherein said clamping plane is substantially vertical.

3. The mirror assembly of claim 1 wherein said second jaw includes a guide rail and faces opposite said second support arm guide rail, both guide rails further including surfaces which have a V-shaped cross-section.

4. The mirror assembly of claim 1 wherein said second jaw includes force-applying spring means urging said second jaw in a direction of clamping.

5. The mirror assembly of claim 1 wherein said mirror sub-assembly includes a mirror glass, a support plate, and motor-driven positioning means.

6. The mirror assembly of claim 5 wherein the second jaw is movable to a point of release where the bracket is laterally releasable from the support arm.

7. The mirror assembly of claim 5 wherein the aggregate center of mass of all components is substantially in the clamping plane.

8. The mirror assembly of claim 7 further described in that said first jaw is adjacent the top of the housing and said second jaw is adjacent the bottom of the housing.

9. The mirror assembly of claim 7 wherein the bracket and the support arm are C-shaped.

10. The mirror assembly of claim 1 further including first bearing means interposed between said first jaw and said first guide rail and second bearing means interposed between said second jaw and said second guide rail.

11. The mirror assembly of claim 10 wherein said bearing means are composed of a substantially ablatable material such that initial operation of said slide mechanism causes said bearing means to deposit friction-reducing material upon the surfaces of the guide rails.

12. The mirror assembly of claim 10 wherein said movable clamp jaw includes a lever arm having an end which engages spring means, the end of said lever arm extending to an opposite side of said bracket.

13. The mirror assembly of claim 12 wherein said bracket includes a fulcrum about which the lever arm pivots.

14. The mirror assembly of claim 13 wherein said spring is a coil-type compression spring.

15. The mirror assembly of claim 14 wherein said fulcrum is located on a bottom support plate of said bracket which holds the spring and the second jaw in their operative positions solely by the co-mutual compression of engaged parts.

16. The mirror assembly of claim 14 wherein said spring operates between the end of the lever arm and an abutment both being located on the opposite side of said bracket.

17. The mirror assembly of claim 3 wherein said first jaw further includes a guide rail and faces opposite said first support arm guide rail, both guide rails further including surfaces which have a V-shaped cross-section.

18. The mirror assembly of claim 10 wherein the first and second bearing means are elongate, rod-shaped members.

19. The mirror assembly of claim 18 wherein the bearing rods extend the length of the guide rails on the bracket.

20. The mirror assembly of claim 10 wherein said bearing means are composed of solid PFTE.

21. An extendable mirror assembly for a vehicle, comprising:
    a support arm having a mounting bracket affixed thereto in slidable engagement therewith;
    clamp means on said bracket including two jaws each engaging top and bottom edges of the support arm respectively, said clamp means including at least one movable jaw which extends from a lever arm and pivots on a fulcrum extending from said bracket and forceably engages a bearing surface along one of said edges of the support arm; and
    said bracket slidably affixed to said support arm on only one side thereof such that when said movable jaw is moved to a point of release, the jaws of said clamp means and said bracket are laterally releasable from the edges of said support arm.

* * * * *